(12) United States Patent
Sakaguchi

(10) Patent No.: US 6,960,754 B2
(45) Date of Patent: Nov. 1, 2005

(54) PHOTOELECTRIC CURRENT AND VOLTAGE CONVERTING CIRCUIT

(75) Inventor: Makoto Sakaguchi, Shiga (JP)

(73) Assignee: NEC Compound Semiconductor Devices, Ltd., Kanagawa (JP)

( * ) Notice: Subject to any disclaimer, the term of this patent is extended or adjusted under 35 U.S.C. 154(b) by 0 days.

(21) Appl. No.: 10/923,719

(22) Filed: Aug. 24, 2004

(65) Prior Publication Data

US 2005/0045806 A1 Mar. 3, 2005

(30) Foreign Application Priority Data

Aug. 25, 2003 (JP) .............................. 2003/299436

(51) Int. Cl.[7] ............................................... H01J 40/14
(52) U.S. Cl. .............................. 250/214 A; 250/214 R; 330/110
(58) Field of Search ......................... 250/214 R, 214 A, 250/214 LA, 214 AG, 214 C, 214 DC, 551; 330/59, 110, 308, 260; 327/514

(56) References Cited

U.S. PATENT DOCUMENTS 5,061,859 A   10/1991  Lovelace et al.
5,287,107 A * 2/1994  Gampell et al. ............ 341/137
5,406,071 A    4/1995  Elms
6,166,566 A   12/2000  Strong

FOREIGN PATENT DOCUMENTS

GB   2031630 A    4/1980
JP   S63-236971 A 10/1988
JP   3121339 B2   10/2000

* cited by examiner

Primary Examiner—Kevin Pyo
(74) Attorney, Agent, or Firm—Sughrue Mion, PLLC

(57) ABSTRACT

A photoelectric current and voltage converting circuit converts a photo current Ipd generated by the input to photo diode into a voltage Va by a feedback resistor connected to an inverting input and an output of an amplifier, and compares the output voltage Va with a threshold voltage Vth from a reference voltage circuit to output a binary signal. Divided voltage Vb gained from a connecting node of the feedback resistors is inputted to a non-inverting input of the reference voltage circuit and is offset to a higher voltage by Vos to generate a threshold voltage Vth. As a result, the threshold voltage Vth can be supplied which impedance is low and robust to noise, and errors of the comparator or jitter of the output of the comparator are suppressed.

1 Claim, 4 Drawing Sheets

US 6,960,754 B2

PHOTOELECTRIC CURRENT AND VOLTAGE CONVERTING CIRCUIT

BACKGROUND OF THE INVENTION

1. Field of the Invention

The present invention relates to a photoelectric current and voltage converting circuit which converts a photoelectric current generated from a light receiving element into a voltage and outputs the voltage as a binary signal.

2. Description of the Related Art

The photoelectric current and voltage converting circuit, which converts a photoelectric current generated from a light receiving element into voltage, such as a photodiode, and outputs the voltage as a binary signal, is applied in various technical fields.

For example, the photoelectric current and voltage converting circuit is used in a light reception circuit of a photo-coupler in order to isolate an input and output electrically as Factory Automation.

The photo-coupler supplies a light emitting element (e.g. a light-emitting diode) on input side with an electric signal to transmit a light signal from the light emitting element to a light receiving element on output side, and outputs an electric signal from the light receiving element.

This photoelectric current and voltage converting circuit is made into an IC and is used as a light receiving IC.

Hereinafter, a photoelectric current and voltage converting circuit 200 is explained as a conventional technique with reference to FIG. 1.

The photoelectric current and voltage converting circuit 200 includes a photodiode 1, an amplifier 12, a reference voltage circuit 16, a voltage divider circuit 20, and a comparator 30.

Here, an anode is grounded to the photodiode 1. The amplifier 12 includes an inverting amplifier 13. A non-inverting of the amplifier inputs a voltage source 15 (voltage is described as "Vo") which reference voltage is on the ground voltage.

A cathode of the photodiode 1 is connected to an inverting input, and a feedback resistor 14 is connected between the inverting input terminal and the feedback resistor 14.

The reference voltage circuit 16 includes a non-inverting amplifier 17 as an operational amplifier. An offset resistor 18 is connected between an inverting input and an output. The inverting input is grounded through a constant current source 19, and the non-inverting input terminal is connected to the inverting input of the inverting amplifier 13.

As for voltage divider circuit 20, a resistor 21 and a resistor 22 are connected in series with the outputs of the amplifier 12 and the reference voltage circuit 16. The series connecting node is grounded through a condenser 23.

Further, as for the comparator 30, the non-inverting input of which is connected to the output of the amplifier 12. The inverting input of the comparator 30 is connected to the connecting nodes of the first resistor 21 and the second resistor 22.

An operation of the photoelectric current and voltage converting circuit 200 having such constitution will be described bellow.

A photoelectric current Ipd is not generated when a light is not inputted to the photodiode 1. Therefore, the photoelectric current Ipd does not flow through the feedback resistor 14 of the amplifier 12. As a result, the voltages of the output and the inverting input of the amplifier 12 are set in the same level each other, and set same as the voltage Vo of the non-inverting input of the amplifier 12 by a virtual short.

On the other hand, on the reference voltage circuit 16, an offset voltage Vos is generated by the offset resistor 18 and the constant current source 19.

A voltage higher than the voltage on the inverting input of the inverting amplifier 13 is outputted as a reference voltage Vref (=Vo+Vos). The higher voltage to be outputted is offset due to the difference of the offset voltage Vos.

The voltage between the outputs of the amplifier 12 and the reference voltage circuit 16 is divided by the first and second resistors 21 and 22 in the voltage divider circuit 20 to develop a threshold voltage Vth.

When the voltage Va (=Vo) on the output of the amplifier 12 is outputted, the voltage is compared to the threshold voltage Vth by the comparator 30.

Here, the output voltage Vo of the amplifier 12 is lower than the threshold voltage Vth. As a result, the binary signal is set Low and is outputted as an output signal Vout from the comparator 30 in the photoelectric current and voltage converting circuit 200 shown in FIG. 1.

On the contrary, the photoelectric current Ipd is generated when the light is inputted to the photodiode 1 due to the light intensity.

The photoelectric current Ipd flows trough the feedback resistor 14 in the direction of the inverting input from the output of the inverting amplifier 13.

As a result, the voltage of the photoelectric current Ipd is converted into a voltage Vr (=Ipd×Rf), where the Rf is a resistance value of the feedback resistor 14 between the two terminals of the feedback resistor 14, and then the voltage Va on the output develops Va (=Vo+Vr). When this voltage Va is outputted to the comparator 30 from the output of the amplifier 12, the voltage is compared with the threshold Vth from the voltage divider circuit 20.

When the intensity of the light-input to the photodiode 1 is lager than a certain level, the voltage Va is larger than the threshold Vth, then, judged as being inputted a signal. As a result, on the contrary of the above-mentioned case that the light is not inputted, the binary signal is set high and is outputted.

On the other hand, the intensity of the light-input to the photodiode 1 is less than the certain level, the voltage Va is less than the threshold Vth, and then, the binary signal is outputted as same as in the level when the light is not outputted. (Refer to Japanese Patent JP B 3121339)

An operation of the above-mentioned photoelectric current and voltage converting circuit 200 is described bellow with reference to a timing chart shown in FIG. 2.

First, as shown in FIG. 2A, the output voltage Va of amplifier 12 changes in Vo+Vr from the voltage Vo in response to the photoelectric current.

The reference voltage Vref (=Vo+Vos) is constant not having any influence of the photoelectric current Ipd.

The reference voltage Vref and the output voltage Va are divided by the first and the second divider resistors 21 and 22 of the voltage divider circuit 20, and are delayed by the condenser 23 so as to be the threshold voltage Vth as shown in FIG. 2A.

That is, when the output voltage Va of the amplifier 12 is rising; the threshold voltage Vth is lower than the reference voltage Vref in response to the dividing ratio of the voltage, and when the output voltage Va of the amplifier 12 is trailing, the threshold voltage Vth is higher than the reference voltage Vref in response to the dividing ratio of the voltage.

FIG. 2 is a timing chart showing the first and second divider resistances in the ratio two to one, as is exemplified in the Japanese Patent 3121339.

In this way, the output of the comparator 30 is switched immediately after the rising and trailing of the output Va of the amplifier 12, so that the level of the output signal Vout can be described such as the line graph shown in FIG. 2B.

Here, the impedance of the inverting input of the comparator 30 is considered bellow.

Inverting amplifier 13 and non-inverting amplifier 17 are conventional operational amplifier circuits. There input impedance are very large and can be treated as the impedance are infinite. There output impedance are very small and can be treated as zero. Therefore, the impedance of the inverting input of the comparator 30 is nearly same with the value that the first resistor 21 and the second resistor 22 and the condenser 23 are connected in parallel.

The resistor 21 and 22 usually have high resistances in the conventional circuit shown in FIG. 1, so that the impedance is high and is easily influenced by noise. Especially, when the output voltage Va of the amplifier 12 is rising, the threshold voltage Vth is lower than the reference voltage Vref in response to the ratio of the divided resistance so that the difference between the output voltage Va of the amplifier 12 and the threshold voltage Vth become small. It may cause errors of the comparator 30 or jitter of the output of the amplifier.

SUMMARY OF THE INVENTION

Therefore, an object of the present invention is to provide a photoelectric current and voltage converting circuit which supplies the threshold voltage Vth in low impedance and improves the robustness to noise occurred when the input of a light to the light receiving element.

In an aspect of the present invention, a photoelectric current and voltage converting circuit includes a light receiving element which receives light to generate a photo current, an amplifier having an input receiving the photo current and an output to develop an output voltage on the output in response to said photo current, a feedback resistor connected between the input and said output and includes a first feedback resistor and a second feedback resistor connected in series, a reference voltage circuit which generates a reference voltage, and a comparator comparing said output voltage of said amplifier with said reference voltage to output a binary signal. The reference voltage circuit includes an operational amplifier, an offset resistor connected between an inverting input and an output of the operational amplifier, and a constant current source connected between the inverting input and a ground. And a non-inverting input of the operational amplifier is connected to a connecting node of the first and second feedback resistors.

In the photoelectric current and voltage converting circuit in the present invention, at the amplifier which converts a photo current generated by a light receiving element to a voltage, a divided voltage gained from an intermediate point of feedback resistors is inputted to a non-inverting input of a reference voltage circuit and is offset at a constant voltage to be higher level, and is compared with the output of the amplifier.

Therefore, elements for generating a threshold voltage inputted to a comparator like a divided resistor connected between the output of an amplifier and the output of a reference voltage circuit or a condenser are not needed so that the manufacturing cost of a light receiving IC.

Further, because an impedance of the output of a comparator to which the threshold voltage is inputted can be very small, the photoelectric current and voltage converting circuit in the present invention is robust to noise and prevent the comparator from errors and the output of the comparator from jitter.

DESCRIPTION OF THE PREFERRED EMBODIMENTS

Hereinafter, a first embodiment of the photoelectric current and voltage converting circuit 100 of the present invention is described bellow with reference to FIG. 3 and FIG. 4.

Figure 1:
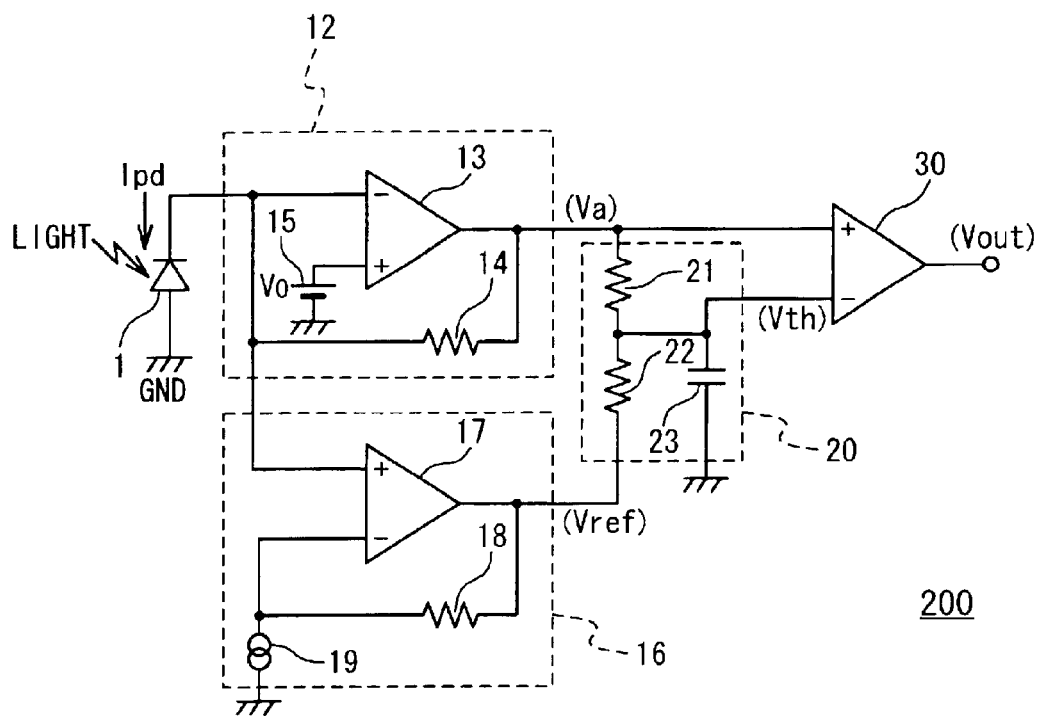
FIG. 1 is the circuit diagram of a light receiving IC according to a conventional technique.
Figures 2A, 2B:
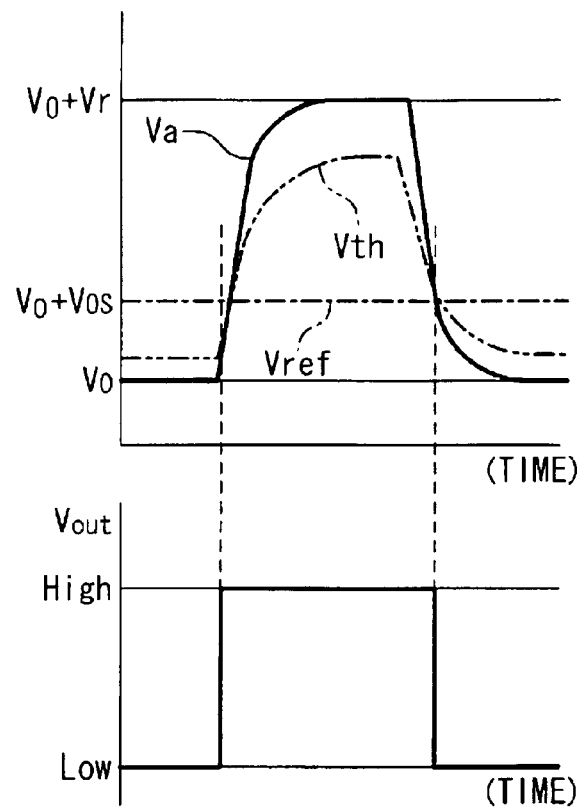
FIGS. 2A and 2B are timing charts for explaining the operation of the light receiving IC described in FIG. 1.
Figure 3:
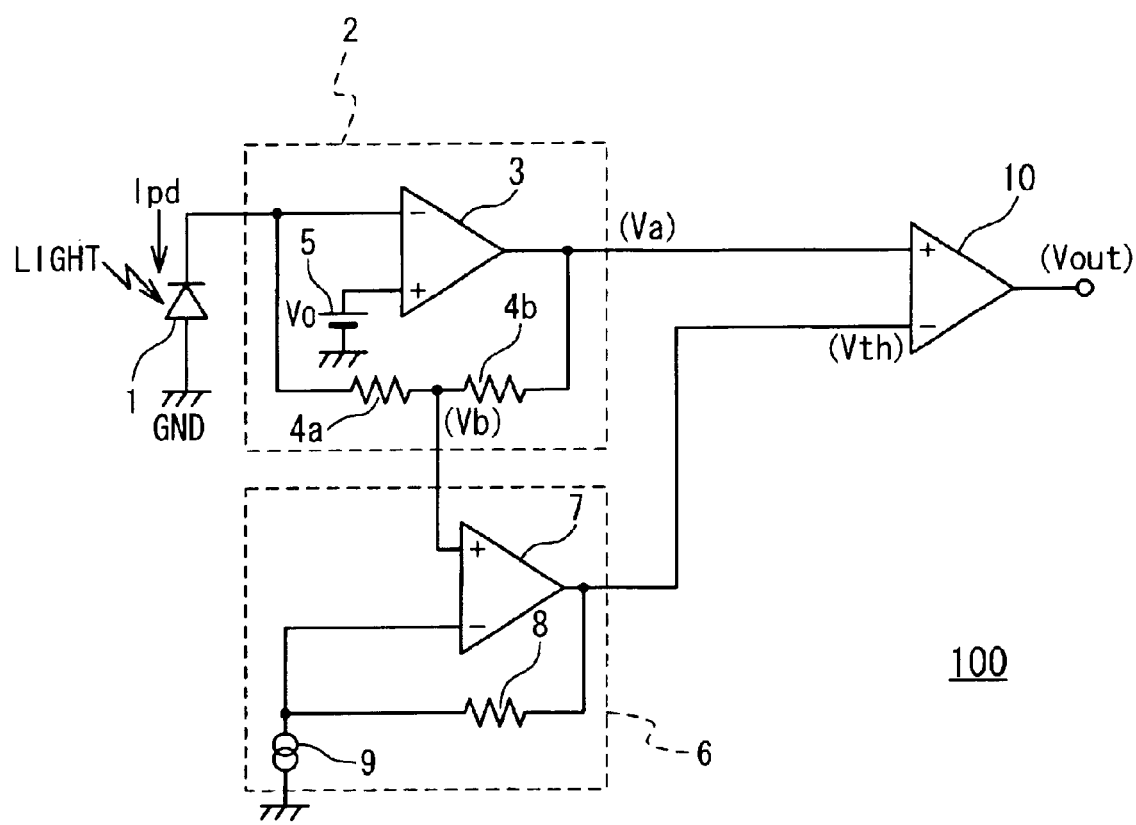
FIG. 3 is the circuit diagram of a light receiving IC according to the first embodiment of the present invention.

As shown in FIG. 3, the photoelectric current and voltage converting circuit 100 includes a photodiode 1, an amplifier 2, a reference voltage circuit 6, and a comparator 10. Here, an anode of the photodiode 1 is grounded.

The amplifier 2 uses an inverting amplifier 3 wherein, an non-inverting input inputs a voltage source 5 (voltage is described as "Vo") which voltage is based on the voltage of the ground. A cathode of the photodiode 1 is connected to an inverting input, and feedback resistors 4a and 4b are connected in series between the inverting input and the output.

The reference voltage circuit 6 uses a non-inverting amplifier 7, wherein an offset resistor 8 is connected between an inverting input and an output. The inverting input of the reference voltage circuit 6 is grounded through a constant current source 9, and a non-inverting input is connected to the connecting node of the feedback resistors 4a and 4b, which are arranged in series.

As for the comparator 10, the output of the amplifier 2 connects to the non-inverting input, and the output of the reference voltage circuit 6 connects to the inverting input of the comparator 10.

An operation of the photoelectric current and voltage converting circuit 100 having such constitution will be described bellow. A photoelectric current Ipd is not generated when a light is not inputted to the photodiode 1.

Therefore, the photoelectric current Ipd does not flow through the feedback resistors 4a and 4b of the amplifier 2. As a result, the voltages of the output and the inverting input of the amplifier 2 are set in the same level each other, and set same as the voltage Vo of the non-inverting input of the amplifier 2 by a virtual short. Then, the voltage Vo becomes equal to a division voltage Vb which indicates a voltage of the connecting node of the feedback resistors 4a and 4b.

On the other hand, on the reference voltage circuit 6, an offset voltage Vos is generated by the offset resistor 8 and the constant current source 9. A voltage higher than the voltage on the connecting node of the feedback resistors 4a and 4b is outputted as a reference voltage Vth (=Vo+Vos) to the inverting input of the comparator 10.

The higher voltage to be outputted is offset due to the difference of the offset voltage Vos. The voltages of the output of the amplifier 2 Va (=Vo) and the threshold voltage Vth are compared by the comparator 10. Here, the output voltage Vo of the amplifier 2 is lower than the threshold voltage Vth. As a result, the binary signal is set in low and outputted as an output signal Vout from the comparator 10 in the photoelectric current and voltage converting circuit 100 as shown in FIG. 3.

On the contrary, the photoelectric current Ipd is generated when the light is inputted to the photodiode 1 due to the light intensity. The photoelectric current Ipd flows trough the feedback resistors 4a and 4b in the direction of the inverting input from the output of the inverting amplifier 3. As a result, the voltage of the photoelectric current Ipd is converted into a voltage Vr (=Ipd×Rf), where the Rf is a sum of resistance values of the feedback resistors 4a and 4b, and then the voltage Va on the output develops up to Va (=Vo+Vr).

On the other hand, on the reference voltage circuit 6, a higher voltage outputted to the inverting input of the comparator 10 as threshold voltage Vth (=Vb+Vos). The higher voltage is offset in the difference of the offset voltage Vos comparing with the division voltage which is due to a ratio of the feedback resistors 4a and 4b.

When the intensity of the light-input to the photodiode 1 is lager than a certain level, the voltage Va is larger than the threshold Vth, then, judged as being inputted a signal. As a result, on the contrary of the above-mentioned case that the light is not inputted, the binary signal is set high and is outputted.

When the intensity of the light-input to the photodiode 1 is less than a certain level, the voltage Va is less than the threshold Vth, the binary signal is outputted as same as in the level when the light is not outputted.

Figure 4A:
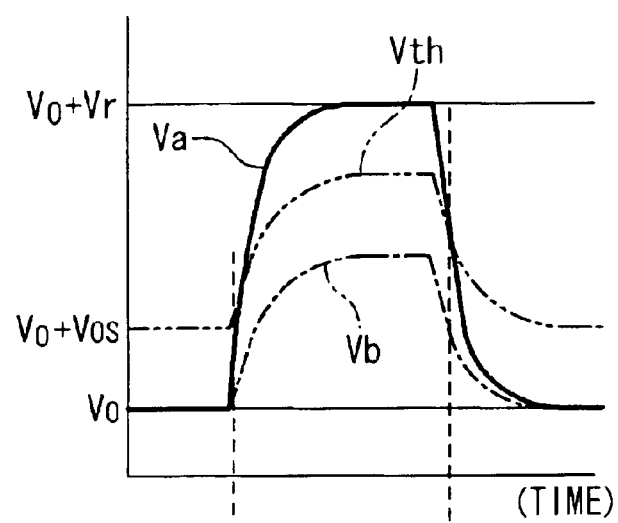
FIGS. 4A and 4B are timing charts for explaining the operation of the light receiving IC described in FIG. 3.

An operation of the above-mentioned photoelectric current and voltage converting circuit 100 is described bellow with reference to a timing chart shown in FIG. 4. First of all, the output voltage Va on the amplifier 2 changes in up to Vo+Vr from the voltage Vo in response to the photoelectric current as shown in FIG. 4A.

The voltage Vr (=Ipd×Rf) is to be divided according to the resistance ratio of the feedback resistors 4a and 4b, and a division voltage Vb is summation of the divided voltage and the voltage Vo.

Further, the offset voltage Vos is added to the divided voltage Vb and is delayed by a time constant of the non-inverting amplifier 7 as an operational amplifier circuit so as to be the threshold voltage Vth as shown in FIG. 4A.

Figure 4B:
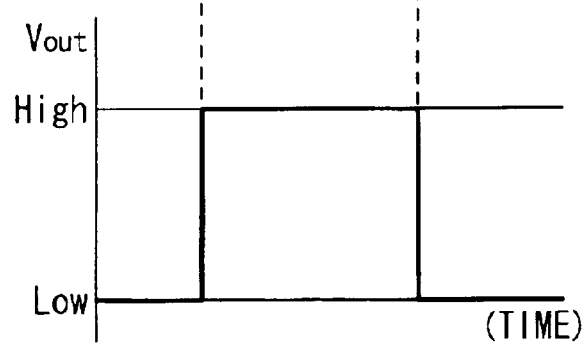

In this way, the output of the comparator 10 is quickly switched immediately after rising and trailing of the output of the amplifier 2, so that the level of the output signal Vout from the comparator 10 can be described such as the line graph shown in FIG. 4B.

In the photoelectric current and voltage converting circuit of the present invention as described up to this, the division voltage Vb gained from the connecting node of the feedback resistors is inputted to the non-inverting input of the reference voltage circuit 6 and is offset at a constant voltage to be higher level, then, outputted to the comparator 10 so as to be compared with the output of the amplifier 2.

Therefore, elements to generate the threshold voltage Vth which is inputted to the comparators 10, such as a resistor to be divided and a condenser shown in conventional circuits, are not necessary for the present invention, so that the manufacturing cost of an IC to receive the light can be reduced.

Also, Because the impedance of the input of the comparator to which the threshold voltage Vth inputs can be remarkably minimized, it is possible to reduce a noise, to prevent a malfunction in the comparator and jitter at the output of the comparator.

It should be noted that the voltage on the inverting amplifier by the feedback resistance might be substituted for the voltage on the inverting input in the inverting amplifier 3. In this case, the threshold voltage Vth is constant at the level of the voltage Vo.

Also, the amplifier 2 of the present invention may be constituted as follow. That is, a source of the Nch-type MOS transistor is grounded and a constant current source is connected between a drain and a power supply voltage terminal. The connecting node of the drain and the constant current source works as an input of next stage for amplifying. Such plural stages for amplifying are connected in series so as to form an inverting amplifier, and the feed back resistor connect with the input of the first stage and the output of the final stage.

Furthermore, if it is needed to invert the output of the binary signal contrary to the first embodiment, the output of the amplifier 2 should be connected to the inverting input of the comparator 10, and the output of the reference voltage circuit 6 should be connected to the non-inverting input of the comparator 10.

The photoelectric current and voltage converting circuit according to the present invention can be applied to an infrared-ray communication, an optical receiver circuit like a optical fiber cable communication, a photo detecting circuit which transforms a laser reflected light signal to a electric digital signal used in a recent optical disk device.

What is claimed is:

1. A photoelectric current and voltage converting circuit comprising;

a light receiving element which receives light to generate a photo current;

an amplifier having an input receiving said photo current and an output to develop an output voltage on said output in response to said photo current;

a feedback resistor connected between said input and said output and includes a first feedback resistor and a second feedback resistor connected in series;

a reference voltage circuit which generates a reference voltage; and a comparator comparing said output voltage of said amplifier with said reference voltage to output a binary signal, wherein said reference voltage circuit includes;

an operational amplifier;

an offset resistor connected between an inverting input and an output of said operational amplifier; and a constant current source connected between said inverting input and a ground, and a non-inverting input of said operational amplifier is connected to a connecting node of said first and second feedback resistors.

* * * * *